United States Patent
Poulos

(10) Patent No.: US 9,585,403 B2
(45) Date of Patent: Mar. 7, 2017

(54) MICROWAVEABLE BATTER COMPOSITION AND A METHOD FOR PREPARING SAME

(71) Applicant: Hotbake Systems (Proprietary) Limited, Johannesburg (ZA)

(72) Inventor: Gregory Mark Poulos, Johannesburg (ZA)

(73) Assignee: Hotbake Systems (Proprietary) Limited, Johannesburg (ZA)

( * ) Notice: Subject to any disclaimer, the term of this patent is extended or adjusted under 35 U.S.C. 154(b) by 31 days.

(21) Appl. No.: 14/402,811

(22) PCT Filed: May 21, 2013

(86) PCT No.: PCT/IB2013/054157
§ 371 (c)(1),
(2) Date: Nov. 21, 2014

(87) PCT Pub. No.: WO2013/175391
PCT Pub. Date: Nov. 28, 2013

(65) Prior Publication Data
US 2015/0110923 A1    Apr. 23, 2015

(30) Foreign Application Priority Data

May 21, 2012 (ZA) ................................. 2012/03684

(51) Int. Cl.
| | | |
|---|---|---|
| *A21D 10/04* | (2006.01) | |
| *A21D 6/00* | (2006.01) | |
| *A21D 8/06* | (2006.01) | |
| *A21D 13/00* | (2006.01) | |

(52) U.S. Cl.
CPC ............ *A21D 10/045* (2013.01); *A21D 6/001* (2013.01); *A21D 8/06* (2013.01); *A21D 10/04* (2013.01); *A21D 13/0006* (2013.01)

(58) Field of Classification Search
CPC ............................... A21D 13/04; A21D 10/045
USPC ......................................................... 426/549
See application file for complete search history.

(56) References Cited

U.S. PATENT DOCUMENTS

| | | |
|---|---|---|
| 5,101,084 A | 3/1992 | Atwell et al. |
| 5,215,774 A | 6/1993 | Moder et al. |
| 8,632,831 B2 * | 1/2014 | Perry ................. B65D 81/2076 219/728 |
| 2002/0061353 A1 * | 5/2002 | McPherson ........ A21D 13/0093 426/549 |
| 2003/0113424 A1 | 6/2003 | Huang et al. |
| 2003/0206994 A1 | 11/2003 | Jahnke |
| 2008/0063751 A1 | 3/2008 | Kou |
| 2010/0034933 A1 | 2/2010 | Crawford et al. |
| 2011/0129575 A1 | 6/2011 | Li et al. |

FOREIGN PATENT DOCUMENTS

| | | |
|---|---|---|
| WO | WO01/35751 | 5/2001 |
| WO | WO2009/154588 | 12/2009 |

OTHER PUBLICATIONS

"Hot brownie with ice cream, Burger King", Nov. 5, 2011, retrieved from the internet at <<http://www.burgerking.nl/menu/hot-brownie-with-icecream>>, retrieved on Jan. 27, 2014, pp. 4, 6, 7.
PCT Search Report mailed Feb. 11, 2014 for PCT Application No. PCT/IB2013/054157, 4 pages.

* cited by examiner

*Primary Examiner* — Hamid R Badr
(74) *Attorney, Agent, or Firm* — Lee & Hayes, PLLC

(57) ABSTRACT

This invention relates to a microwaveable composition comprising a batter component comprising from about 10 wt % to about 45 wt % of flour, from about 0.2 wt % to about 1.0 wt % of an encapsulated leavening agent, and from about 10 wt % to about 35 wt % of water, by weight of the batter component, and a paste component, the composition being microwaveable at a power output of between about 800 W and about 2100 W from a frozen state to a multi-layered cooked product in less than about 50 seconds. The invention also relates to a method for preparing the microwaveable composition.

11 Claims, No Drawings

MICROWAVEABLE BATTER COMPOSITION AND A METHOD FOR PREPARING SAME

FIELD OF THE INVENTION

THIS invention relates to a microwaveable composition that can be microwaved from a frozen state into a final multi-layer microwaved food product in less than 50 seconds. The invention also relates to a method of preparing the microwaveable composition.

BACKGROUND TO THE INVENTION

Microwave cooking has become a very popular method for consumers to prepare food due to factors such as the nature of modern lifestyles, the relative ease of preparation generally associated with microwave cooking, and the relative speed at which these meals can be cooked or heated.

However, microwave cooking remains problematic in terms of at least certain food products, in that problems are still being experienced with the comparative taste, palatability, and/or texture of microwave cooked food products.

Microwaved flour-based products, in particular products containing yeast or chemical leavening agents, such as breads and cakes, suffer from the drawback that such products are often not pleasant in comparison to regular oven baked products. Microwave heating can be uneven and can result in toughness and the rapid onset of staleness, further complicating the development of agreeable microwaveable food products.

Attempts have been made to address the above shortcomings of the prior art by the development of "rich" formulations. These "rich" formulations contain high ratios of expensive non-flour ingredients and are typically low in water content. Microwave cooking depends on the moisture content of the formulation to be cooked and low water content "rich" formulations therefore take longer to cook.

Other more expensive formulations and complicated methods of manufacture for microwaveable compositions (food products) have been suggested to address some of the shortcomings in the prior art.

Despite the above shortcomings, industry, and in particular the fast food industry, continuously seeks to harness the advantages associated with microwave cooking in order to produce microwaveable food products, that can be prepared within a short space of time, while still being organoleptically pleasing to the consumer.

Furthermore, as the price of food products escalate, so industry attempts to find opportunities for cost-saving. Often, in the restaurant industry, prepared food products go to waste as a result of the difficulties associated with accurate catering. The desire to serve customers as rapidly as possible often results in food items being prepared in advance, only to go to waste when sufficient quantities have not been sold within the shelf-life of the prepared product.

Therefore, there remains a need for a microwaveable composition that at least partly addresses some of the current shortcomings in the art.

In particular, there remains a need for relatively low-cost microwaveable compositions that, when microwave cooked, produce food products that are of comparatively pleasant taste, palatability, and/or texture.

In particular, there remains the further need that these microwaveable compositions should be usable in the fast food industry, that is to say that these compositions should be capable of preparation, upon receiving the order from the consumer, within a time limit that is acceptable in this particular industry.

In particular, there remains the further need that these microwaveable compositions should be capable of microwave cooking from a frozen state within a time limit that is acceptable to the fast food industry, thereby reducing the wastage associated with unsold product.

SUMMARY OF THE INVENTION

According to a first aspect to the present invention there is provided a microwaveable composition comprising:
 a batter component comprising from about 10 wt % to about 45 wt % of flour, from about 0.2 wt % to about 1.0 wt % of an encapsulated leavening agent, and from about 10 wt % to about 35 wt % of water, by weight of the batter component, and
 a paste component,
wherein the composition is microwaveable at a power output of between about 800 Watts (W) and about 2100 W from a frozen state to a multi-layered cooked product in less than about 50 seconds.

Preferably, the microwavable composition comprises from about 50 wt % to about 90 wt % of the batter component and from about 10 wt % to about 50% of the paste component, by weight of the composition.

Even more preferably, the microwavable composition comprises from about 60 wt % to about 75 wt % of the batter component and from about 25 wt % to about 40 wt % of the paste component, by weight of the composition.

In one embodiment, the microwaveable composition according to the present invention is preferably microwaveable to a multi-layered cooked product in from about 45 seconds to about 50 seconds.

In a preferred embodiment, the microwaveable composition according to the present invention is microwaveable to a cooked product in about 45 seconds or less.

The microwaveable composition according to the present invention may be frozen at a temperature of less than about −10° C. (degrees Celcius), preferably less than about −15° C., more preferably about −18° C.

In one embodiment of the invention, the microwaveable composition may be frozen by case hardening.

In a further embodiment of the present invention, the microwaveable composition may be topped with a topping selected from the list consisting of ice-cream, frozen yoghurt, yoghurt, frosting, cream, non-dairy cream, and/or fruit, once the composition has been microwave cooked.

According to a second aspect to the present invention there is provided a method of preparing a microwaveable composition, the method comprising the steps of:
 a) preparing a batter component comprising the steps of:
  forming a first pre-mix comprising from about 5 wt % to about 15 wt % of vegetable shortening and from about 5 wt % to about 25 wt % of castor sugar, by weight of the batter component, adding the first pre-mix to a mixer and mixing,
  forming a second pre-mix comprising from about 10 wt % to about 45 wt % of flour, and from about 0.2 wt % to about 1.0 wt % of an encapsulated leavening agent, by weight of the batter component, adding the second pre-mix to the first pre-mix and mixing,
  forming a third pre-mix comprising from about 1 wt % to about 5 wt % invert sugar, and from about 0.01 wt % to about 2 wt % flavourants, by weight of the batter component, adding the third pre-mix to the mixture of the first and second pre-mix, and mixing,
adding from about 10 wt % to about 20 wt % whole egg, by weight of the batter component, to the mixture of the first, second and third pre-mix and mixing,
adding from about 10 wt % to about 35 wt % of water, by weight of the batter component, to the mixture of the whole egg, first, second and third pre-mix to form the prepared mixture and mixing,
further mixing the mixture to form the batter component,
b) adding a paste component to a microwaveable container,
c) adding the batter component to the microwaveable container to form a microwaveable composition, and
d) freezing the microwaveable composition.

In one embodiment, the first pre-mix is formed by mixing, for about 1 minute at about 42 rpm and about 1 minute at about 69 rpm, the second pre-mix and the first pre-mix are mixed together for about 2 minutes at about 42 rpm, the third pre-mix is mixed with the mixture of the first and second pre-mix for about 1 minute at about 42 rpm, whole egg is mixed with the mixture of the first, second and third pre-mix for about 1 minute at about 42 rpm, water is mixed with the mixture of the whole egg, first, second and third pre-mix for about 3 minutes at 42 rpm, and the resultant mixture is mixed for about 2 minutes on at about 69 rpm and about 6 minutes at about 115 rpm.

In one embodiment, the method further comprises the step of adding an ingredient selected from the list of caramel chips, chocolate chips and/or fruit bits to the batter component, and mixing, for example, for about 1 minute at about 115 rpm.

Preferably, the microwaveable composition according to the method comprises from about 50 wt % to about 90 wt % of the batter component and from about 10 wt % to about 50% of the paste component, by weight of the composition.

Even more preferably, the microwaveable composition according to the method comprises from about 60 wt % to about 70 wt % of the batter component and from about 25 wt % to about 40 wt % of the paste component, by weight of the composition.

In one embodiment, the microwaveable composition according to the method is frozen at a temperature of less than about −10° C.

In a preferred embodiment, the microwaveable composition according to the method is frozen at a temperature of less than about −15° C.

Even more preferably, the microwaveable composition according to the method is frozen at a temperature of about −18° C.

In one embodiment of the invention, the microwaveable composition according to the method is frozen by case hardening.

According to a third aspect to the present invention there is provided a multi-layer microwaved food product comprising a first layer consisting of a paste component, a second layer consisting of a cooked batter component and optionally, a third layer consisting of a topping.

The topping may consist of ice-cream, frozen yoghurt, yoghurt, frosting, cream, non-dairy cream, and/or fruit.

The food product may be served in a container, such as a cup, optionally with a lid.

DETAILED DESCRIPTION OF PREFERRED EMBODIMENTS

This invention provides for a microwaveable composition that is microwaveable at a power output of between about 800 W and about 2100 W from a frozen state to a multi-layered cooked product in less than about 50 seconds. The invention also provides for a method of preparing the microwaveable composition.

In this specification, the following terms have the following meanings.

Flour means the powder that is obtained by grinding cereal grains, seeds, or roots, in particular wheat grains.

Encapsulated leavening agent means a chemical leavening agent that is encapsulated by a degradable barrier material to control the reaction thereof until a time during baking.

Vegetable shortening means a solid fat made from vegetable oils, such as soybean and cottonseed oil, which have been hydrogenated or partially hydrogenated or fractionated to create a solid at room temperature.

Castor sugar means a very fine sugar with the grains having an average particle size in the range of 150-450 µm. Castor sugar is commonly used in baking and confectionary applications.

Invert sugar means a liquid sugar product that contains glucose and fructose and is the result of the splitting of sucrose into these two components.

Whole egg means egg products including whole eggs and whole egg pulp, with or without non-egg ingredients, and may be in liquid, frozen, or dried form.

Emulsifier means a compound or a substance that acts as a stabiliser for emulsions preventing the liquids from separating.

Hi ratio cake flour means flour having a low protein content that can accept hi ratios of sugar, eggs and liquids.

The invention will now be described with reference to the following non-limiting examples.

EXAMPLE 1

The microwaveable composition comprises a paste component and a batter component. About 30 g of the paste component is deposited into a microwaveable container in the form of a cup to form a first (paste) layer. About 60 g of the batter component is then deposited into the microwaveable cup containing the first paste layer to form a second (batter) layer, thereby forming a multi-layer microwaveable composition. The multi-layer microwaveable composition is then frozen in the microwaveable cup.

The batter component of the microwaveable composition is prepared by the formation of pre-mix formulations that are mixed in a planetary mixer (typically Hobart Corporation, Ohio or AMF Bakery Systems, Richmond, Va.) to form the final batter component. The batter component is flavoured according to methods known to those skilled in the art.

For a chocolate flavoured variation according to the present invention chocolate flavoured batter is prepared by forming a first pre-mix consisting of 8.63 wt % vegetable shortening (Hi Lite (Trade Mark), Hudson & Knight (Pty) Ltd, South Africa) and 12.94 wt % castor sugar, the weight percentages being by weight of the chocolate flavoured batter component. This first pre-mix is then added to the mixer and mixed at a speed of about 42 rpm for 1 minute.

After this mixing step the mixer is stopped to allow for scraping of the beater, after which this first pre-mix is subjected to a further period of mixing for 1 minute at about 69 rpm to obtain a consistent homogenous mix.

A second pre-mix is formed consisting of 10.78 wt % cake flour, 10.78 wt % hi ratio cake flour, 0.54 wt % of an emulsifier (Ovalett (Trade Mark), South Bakels (Pty) Ltd, South Africa), 0.39 wt % bicarbonate of soda, 0.48 wt % of an encapsulated leavening agent (Balchem Corporation, New York) comprising encapsulated sodium bicarbonate and encapsulated sodium aluminium phosphate, 0.27 wt % sodium acid pyrophosphate, 0.11 wt % di calcium phosphate dihydrate, 1.08 wt % of a thickener (Quick Jel (Trade Mark), South Bakels (Pty) Ltd, South Africa), 0.37 wt % salt, 0.71 wt % whey milk powder, 0.60 wt % vital wheat gluten, 0.22 wt % caramel powder, and 6.74 wt % cocoa powder. Again, all the weight percentages given are by total weight of the chocolate flavoured batter component.

The second pre-mix is added to the mixer and the content thereof is mixed for 2 minutes at about 42 rpm to obtain a consistent and homogenous mix.

A third pre-mix is formed consisting of 2.93 wt % of an invert sugar (Spintex (Trade Mark), Tongaat Hulett, Tongaat, South Africa), 0.05 wt % of a vanilla flavour, and 0.81 wt % of a chocolate. Again, the weight percentages given are by total weight of the chocolate flavoured batter component. The third pre-mix is then slowly added to the mixer and mixed for 1 minute at about 42 rpm to obtain a consistent and homogenous mix.

After the above mixing step 15.09 wt % whole egg pulp, by weight of the of the total weight of the chocolate flavoured batter component, is slowly added to the mixture and mixed for 1 minute at about 42 rpm to obtain a consistent and homogenous mix without any lumps.

Finally, 25.96 wt % water, by weight of the of the total weight of the chocolate flavoured batter component, is slowly added to the mixture and mixed for 3 minutes at about 42 rpm. After this mixing step the mixer is stopped and the mixing bowl of the mixer is scraped to remove product adhering to the inner walls of the mixer that have not been sufficiently mixed. The mixture is then subjected to a further mixing step for 2 minutes at about 69 rpm, followed by a final mixing step for 6 minutes at a speed of about 115 rpm.

About 30 grams of a chocolate flavoured paste is then deposited into the microwaveable container. The chocolate flavoured paste comprises sugar, non-hydrogenated vegetable shortening, cocoa powder, whey powder, modified corn starch, maltodextrin, emulsifiers and flavouring agents known in the art. The depositing of the paste into the cup can be performed by a pneumatically operated volumetric depositor (typically Turbo-Tools, UK or Unifiller, Canada), or any other method known in the art.

About 60 grams of the chocolate flavoured batter is then deposited into the microwaveable container, onto the layer of chocolate flavoured paste, thereby forming a multi-layer microwaveable chocolate flavoured composition. The depositing of the paste into the cup can be performed by a pneumatically operated volumetric depositor (typically Turbo-Tools, UK or Unifiller, Canada), or any other method known in the art. It will be appreciated by those skilled in the art that a critical balance must be found between the water content, and the resultant viscosity, of the product to be deposited into the container and the desired height of the final cooked product within the microwaveable container (fill volume). The formulation and method of preparation according to the preferred embodiment as described address these issues.

The microwaveable container can be any container that is safe for use in microwave ovens. The container used in the preferred embodiment according to the present invention is a Polypropylene (Grade DL-270A) based container. These containers are preferred because of its ability to be microwaved from a frozen state, because heavy metals and other toxic elements are below required limits during and after the cooking process, and due to the limited migration of components of the composition to the container.

The cup containing the multi-layer microwaveable composition is then frozen to form what can be described as the intermediate uncooked product.

The freezing process may be performed by firstly packing the microwaveable containers filled with paste and batter into a cardboard case used for shipping of the product. The packing process comprises the placing of a plastic bag within the cardboard case, packing the microwaveable containers filled with paste and batter into the case using dividers as necessary, closing the bag, placing a spacer pad on top of the first layer of products, and repeating the steps for a second layer of products. The case is then sealed with freezer stable tape.

The packed and sealed case is then placed in a high velocity freezer at an initial logger temperature of about 20° C. The temperature of the product is then lowered such that the logger temperature reaches a temperature of about −15° C. within about 15 minutes. The product is frozen to reach a core temperature of about −18° C. within about 24 hours from placing the case into the freezer. This process of freezing is referred to as case hardening.

The case hardened product is then ready for delivery to the retailer, restaurant, fast food outlet, or any other customer. It is preferred that a cold chain be maintained between the manufacturing facility and the customer. However, this is not critical due to the use of an encapsulated leavening agent which prevents the leavening process from being activated prior to the application of heat.

The microwaveable composition is transformed into a cooked multi-layer food product through microwave cooking. It is envisaged that microwave ovens used for cooking the microwaveable composition according to the present invention would have a power output of between about 800 W and about 2100 W.

The frozen microwaveable composition is placed in a microwave oven for cooking once an order has been received from a consumer. Depending on the power output of the microwave oven used, the frozen microwaveable composition is transformed into a cooked multi-layer food product within about 45 to 50 seconds when cooking the composition at 80% power output level.

A refrigerated composition is transformed into a cooked multi-layer food product within about 35 to 40 seconds when cooking the thawed composition at 80% power output level.

A composition at ambient temperature is transformed into a cooked multi-layer food product within about 30 to 35 seconds when cooking the thawed composition at 80% power output level.

After final packaging, which may in some embodiments include a sleeve and/or a lid for the container, the cooked multi-layer food product is served to the consumer. The multi-layer food product can also be topped with a topping before being served to the consumer. These toppings include ice-cream, frozen yoghurt, yoghurt, frosting, cream, non-dairy cream, and/or fruit.

In addition to the steps set out above, caramel chips, chocolate chips, fruit bits and/or any other similar solid flavoured component can be added to the batter component. In such instance, the batter component is then subjected to a final mixing step for about 1 minute at about 115 rpm.

EXAMPLE 2

A caramel flavoured variation according to the present invention is prepared by forming a caramel flavoured batter component, depositing a caramel paste into a microwaveable container, and depositing the caramel flavoured batter component onto the paste to form a multi-layer microwaveable product.

The caramel flavoured batter component for the caramel flavoured variation can be prepared according to the step set out in Example 1 above, using the following ingredients and ratios:

| Premix | Ingredient | % (w/w) |
|---|---|---|
| 1 | Hi Lite (Trade Mark) | 9.83 |
|   | Castor Sugar | 14.75 |
| 2 | Cake Flour | 12.29 |
|   | Hi Ratio Cake Flour | 12.29 |
|   | Ovalett (Trade Mark) | 0.69 |
|   | Bicarbonate of Soda | 0.44 |
|   | Raising agent premix | 0.54 |
|   | Sodium Acid Pyrophosphate FG | 0.31 |
|   | Di Calcium Phosphate Dihyd Pharma | 0.12 |
|   | Quick Jel (Trade Mark) | 1.23 |
|   | Salt | 0.42 |
|   | Whey Milk Powder | 0.69 |
|   | Vital Wheat Gluten | 0.62 |
| 3 | Spintex (Trade Mark) | 3.34 |
|   | Vanilla Flavour | 0.17 |
| 4 | Whole Egg Pulp | 13.52 |
| 5 | Water | 18.91 |
| 6 | Caramel Chips | 9.83 |

It will be appreciated by those persons skilled in the art that the invention is not limited to the specific formulations set out above and that minor variations to non-essential ingredients, and small variations to the mixing parameters, will not detract from the essence of the invention. It should further be understood that various other flavours of pastes and/or batters can be used according to the present invention. These flavours could include, but are not limited to vanilla, blueberry, strawberry, blackcurrant, butterscotch, cuppuccino, carrot nut and cream cheese, mixed berries, choc chip and peanut butter, pecan nut and apple cinnamon.

The invention claimed is:

1. A method for producing a multi-layered cooked product, comprising the steps of:
    a) providing a frozen-microwaveable composition comprising:
        a batter component comprising from about 10 wt % to about 45 wt % of flour, from about 0.2 wt % to about 1.0 wt % of an encapsulated leavening agent, and from about 10 wt % to about 35 wt % of water, by weight of the batter component, and
        a paste component, and
    b) microwave cooking the frozen composition at a power output of between about 800 W and about 2100 W for about 50 seconds or less from a frozen state to a multi-layered cooked product.

2. The method according to claim 1, wherein the frozen composition comprises from about 50 wt % to about 90 wt % of the batter component and from about 10 wt % to about 50% of the paste component, by weight of the composition.

3. The method according to claim 1, wherein the frozen composition is microwaveable to a cooked product in from about 45 seconds to about 50 seconds.

4. The method according to claim 1, wherein the composition is frozen at a temperature of less than about −10° C.

5. The method according to claim 1, wherein the composition is frozen by case hardening.

6. The method according to claim 1, wherein the cooked product is topped with a topping selected from the list consisting of ice-cream, frozen yoghurt, yoghurt, frosting, cream, non-dairy cream, and/or fruit.

7. A method of producing a microwaveable composition comprising the steps of:
    a) preparing a batter component comprising the steps of:
        producing a first pre-mix comprising from about 5 wt % to about 15 wt % of vegetable shortening and from about 5 wt % to about 25 wt % of castor sugar, by weight of the batter component, adding the first pre-mix to a mixer and mixing,
        producing a second pre-mix comprising from about 10 wt % to about 45 wt % of flour, and from about 0.2 wt % to about 1.0 wt % of an encapsulated leavening agent, by weight of the batter component, adding the second pre-mix to the mixer and mixing,
        producing a third pre-mix comprising from about 1 wt % to about 5 wt % invert sugar, and from about 0.01 wt % to about 2 wt % flavourants, by weight of the batter component, adding the third pre-mix to the mixture, and mixing,
        adding from about 10 wt % to about 20 wt % whole egg, by weight of the batter component, to the mixer and mixing,
        adding from about 10 wt % to about 35 wt % of water, by weight of the batter component, to the mixer and mixing,
        further mixing to form the batter component,
    b) adding a paste component to a microwaveable container,
    c) adding the batter component to the microwaveable container, and
    d) freezing the composition.

8. The method according to claim 7, further comprising the step of adding an ingredient selected from the list of caramel chips, chocolate chips and/or fruit bits to the batter component and mixing.

9. The method according to claim 7, wherein the composition comprises from about 50 wt % to about 90 wt % of the batter component and from about 10 wt % to about 50% of the paste component, by weight of the composition.

10. The method according to claim 7, wherein the composition is frozen at a temperature of less than about −10° C.

11. The method according to claim 7, wherein the composition is frozen by case hardening.

* * * * *